United States Patent [19]

Hansen et al.

[11] Patent Number: 4,539,632

[45] Date of Patent: Sep. 3, 1985

[54] PROGRAMMABLE MAINTENANCE TIMER SYSTEM

[75] Inventors: John C. Hansen, Spring Grove; Lloyd A. Johnson, Dover, both of Pa.

[73] Assignee: Borg-Warner Corporation, Chicago, Ill.

[21] Appl. No.: 425,733

[22] Filed: Sep. 28, 1982

[51] Int. Cl.[3] .................. G06F 15/46; G05B 19/04; G05D 23/32

[52] U.S. Cl. .................. 364/143; 364/569; 364/144; 62/157; 62/158; 340/309.15

[58] Field of Search .................. 62/157, 158, 231; 364/143, 144, 494, 569, 200, 900; 377/20; 340/309.4, 309.5, 309.15

[56] References Cited

U.S. PATENT DOCUMENTS

| | | | |
|---|---|---|---|
| 4,001,561 | 1/1977 | Quaintance | 377/20 X |
| 4,151,725 | 5/1979 | Kountz et al. | 62/182 |
| 4,168,525 | 9/1979 | Russell | 364/569 |
| 4,264,960 | 4/1981 | Gurr | 364/493 X |
| 4,319,319 | 3/1982 | Wygant | 364/143 |
| 4,342,092 | 7/1982 | Kumagi | 364/569 |
| 4,355,365 | 10/1982 | McCracken et al. | 364/569 |
| 4,371,922 | 2/1983 | Fujita et al. | 364/144 |
| 4,371,945 | 2/1983 | Karr et al. | 364/410 X |
| 4,387,368 | 6/1983 | Day, III et al. | 340/539 |
| 4,404,641 | 9/1983 | Bazarnik | 364/569 |
| 4,404,649 | 10/1983 | Heeger | 364/569 X |

FOREIGN PATENT DOCUMENTS 54-144840 12/1979 Japan .................. 364/569

OTHER PUBLICATIONS

*Motorola Microprocessors*, Motorola, Inc., pp. 3–149, 1981.

*Primary Examiner*—Jerry Smith
*Assistant Examiner*—Jon D. Grossman
*Attorney, Agent, or Firm*—James E. Tracy

[57] ABSTRACT

A programmable maintenance timer system suitable for use with industrial equipment such as a centrifugal water chilling system and a telemetry system including a microprocessor-based computer with a programming device for presetting selectively a maintenance time interval representing a number of hours before a maintenance service is to be performed, for counting down the time interval to zero, and for generating an output signal after the time interval has reached zero to the telemetry system so as to alert service personnel that the industrial equipment is due for a scheduled maintenance. The timer system also includes a non-volatile memory device to record permanently the total elapsed operating hours in the preset maintenance time interval so as to avoid loss of such information upon a power failure and/or back-up battery failure.

4 Claims, 9 Drawing Figures

PROGRAMMABLE MAINTENANCE TIMER SYSTEM

BACKGROUND OF THE INVENTION

This invention relates generally to timing circuits and more specifically, it relates to a programmable maintenance timer system for generating an output signal at the expiration of a preselected number of operating hours of industrial equipment. The present invention has particular application in the monitoring of the amount of total operating hours of centrifugal water chilling systems and generating an output signal after a predetermined number of operating hours on the chilling system has elapsed.

In the operation of various types of centrifugal water chilling systems, the number of hours in which any specific system is actually running during the course of a day may vary significantly due to weather conditions, energy conservation systems, and shut-down of the equipment due to certain malfunctions. Thus, the normal service or scheduled maintenance interval has been very difficult to determine within any reasonable degree of accuracy. For example, if a periodic maintenance interval of six months were selected for a given chilling system, this may or may not be frequent enough dependent upon its operating condition. It the case where a chilling system has been subjected to a high level of stress, the maintenance interval for servicing should be required after a lesser number of operating hours.

It would be, therefore, desirable to provide a programmable maintenance timer system which could notify service personnel when servicing is required for each specific installation. The programmable maintenance timer system of the present invention generates an output signal after a specific number of operating hours has elapsed, for instance, 100 hours, 500 hours, or 1,000 hours, etc. to a telemetry system causing a coded message to be transmitted to a monitoring facility. The telemetry system is preferably of the type which is described in the copending patent application Ser. No. 212,299 of A. R. Day III and F. McMenamy entitled "Telemetry System for Centrifugal Water Chilling Systems" and filed on Nov. 14, 1980, and which issued as U.S. Pat. No. 4,387,368 on June 7, 1983.

SUMMARY OF THE INVENTION

Accordingly, it is a general object of the present invention to provide a programmable maintenance timer system for generating an output signal after a specific number of operating hours has elapsed to a telemetry system causing a coded message to be transmitted to a monitoring facility.

It is another object of the present invention to provide a programmable maintenance timer system for displaying the total elapsed operating hours of industrial equipment and for generating an output signal at the expiration of a preselected number of hours to a telemetry system.

It is another object of the present invention to provide a programmable maintenance timer system which includes microprocessor-based computing means with programming means for presetting selectively a maintenance time interval representing a number of operating hours before a maintenance service is to be performed, for counting down the time interval to zero, and for generating an output signal after the time interval has reached zero to a telemetry system so as to alert service personnel that the industrial equipment is due for a scheduled maintenance.

In accordance with these aims and objectives, there is provided in the present invention a programmable maintenance timer system suitable for use with industrial equipment such as a centrifugal water chilling system and a telemetry system. The programmable maintenance timer sysem includes an interface circuit, a microprocessor-based computing device, and a display device. The interface circuit receives an AC electrical signal and generates a pulse signal in response to the electrical signal. The microprocessor-based computing device provides a signal representative of total elapsed operating hours of the industrial equipment in response to the pulse signal. The computing device includes a programming device for presetting selectively a maintenance time interval representing a number of operating hours before a maintenance service is to be performed, for counting down the time interval to zero, and for generating an output signal after the time interval has reached zero to a telemetry system so as to alert service personnel that the industrial equipment is due for a scheduled maintenance. The display device indicates visually the total elapsed operating hours in response to the signal representative of the total elapsed operating hours.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 5(*b*) is a timing graph showing the input pulses from the water chilling system which are received at the input of the microprocessor depicted in FIG. 4;

FIG. 5(*c*) is a timing graph for updating the internal random-access memory of the microprocessor depicted in FIG. 4;

FIG. 5(*d*) is a timing graph illustrating the pulse train for updating the display unit shown in FIG. 4; and FIG. 5(*e*) is a timing graph illustrating the pulse train for updating the memory in the programmable read-only-memory shown in FIG. 4.

DETAILED DESCRIPTION OF THE PREFERRED EMBODIMENT

Figure 1:
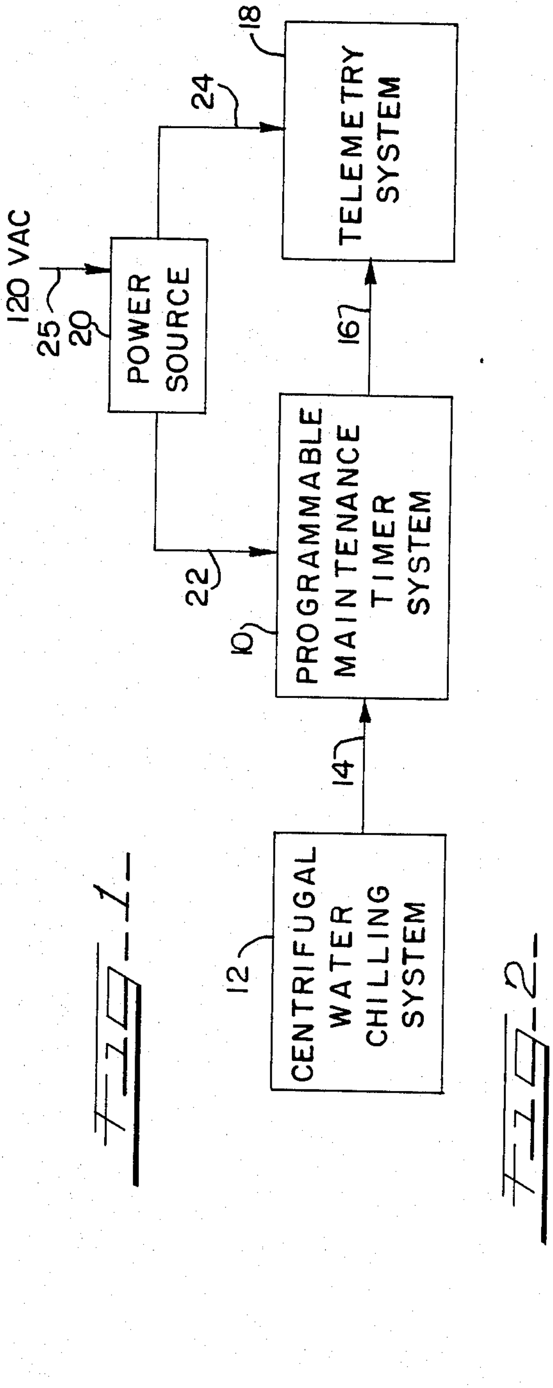
FIG. 1 is an overall block diagram of a programmable maintenance timer system of the present invention interconnected to a centrifugal water chilling system and a telemetry system.

Referring now in detail to the various drawings, there is shown in FIG. 1 a block diagram of the programmable maintenance timer system of the present invention for generating an output signal at the expiration of a preselected number of operating hours in conventional industrial equipment or refrigeration/air conditioning machinery such as a centrifugal water chilling system. An example of a centrifugal water chilling system with which the invention of this application may be used is described and shown in U.S. Pat. No. 4,151,725 to K. J. Kountz et al. and issued on May 1, 1979. The programmable maintenance timer system is generally designated by reference numeral 10 and receives an input signal from a centrifugal water chilling system 12 via line 14. An output signal is generated on line 16 for delivering it to a telemetry system 18 of the type previously mentioned in U.S. Pat. No. 4,387,368. A power source 20 has its output applied to the timer system via the line 22 and to the telemetry system 18 via line 24. Its input is 120 VAC.

For convenience of illustration, the programmable maintenance timer system 10 of the present invention has been interconnected to a centrifugal water chilling system 12 and a telemetry system 18. However, it should be clearly understood by those skilled in the art that other types of industrial equipment and telemetry systems could be employed with the present invention in which it is desired to maintain the total elapsed operating hours and to generate an output signal upon reaching a preset number of operating hours.

Figure 2:
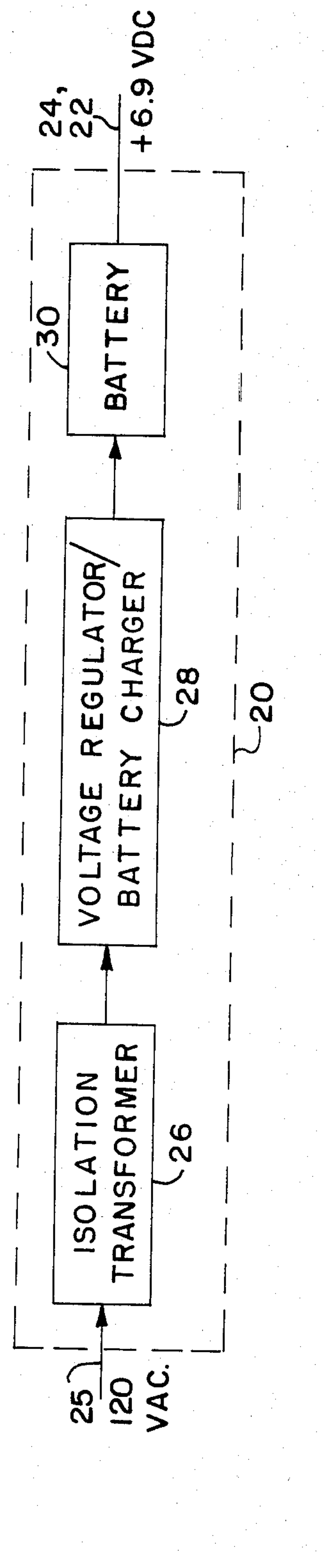
FIG. 2 is a block diagram showing in more detail the power source 20 illustrated in FIG. 1.

A block diagram of the power source 20 of FIG. 1 is shown in somewhat greater detail in FIG. 2. The power source 20 receives a 120 VAC potential on the lead line 25 and includes an isolation transformer 26, a voltage regulator/battery charger 28, and a rechargeable battery 30. The battery 30 is constantly recharged by the battery charger 28 so as to provide a back-up operating power supply to the programmable maintenance timer system 10 when there is a power failure in the 120 VAC potential. The power source 20 delivers a +6.9 VDC regulated voltage on its output lines 22 and 24.

Figure 3:
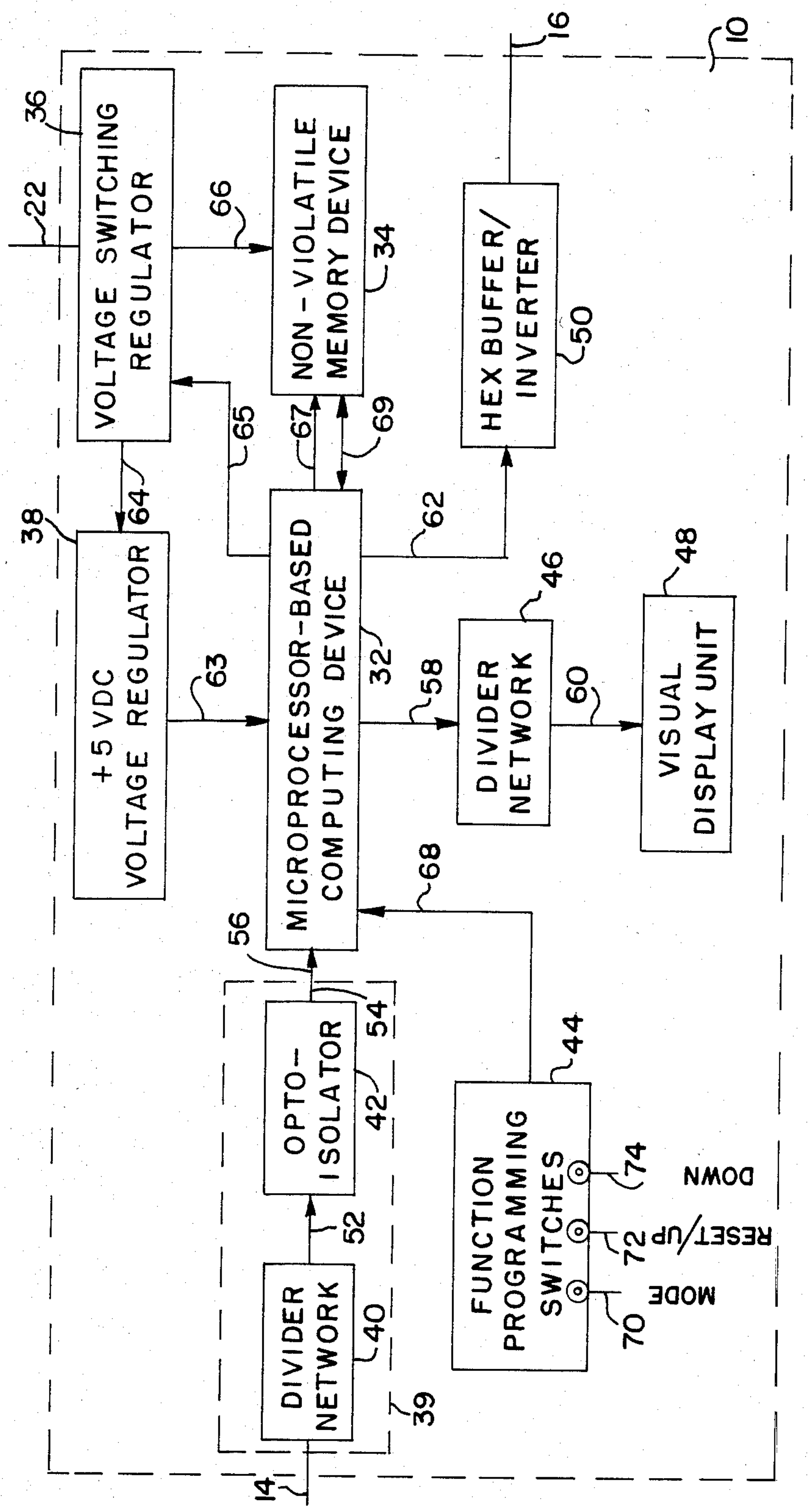
FIG. 3 is a block diagram showing in somewhat greater detail the programmable maintenance timer system illustrated in FIG. 1.

Referring not to FIG. 3 of the drawings, there is shown in block diagram form the details of the programmable maintenance timer system 10 of the present invention. The timer system 10 consists of a microprocessor-based computing device 32, a non-volatile memory device 34, a voltage switching regulator 36, a +5 VDC voltage regulator 38, an interface circuit 39 composed of a divider network 40 and an opto-isolator 42, function programming or selection switches 44, a divider network 46, a visual display unit 48, and hex inverter/buffer 50.

The microprocessor-based computing device 32 is capable of being programmed to count the total elapsed operating hours of the water chilling system. In order to achieve this rsult, an 120 VAC electrical signal on the line 14 having a frequency of 60 Hz is applied to the input of the divider network 40 for scaling it down. This electrical signal represents the "system run" signal from the chilling system. The output via line 52 of the divider network 40 is coupled to the input of the opto-isolator 42 where a pulse signal is generated on its output line 54. The pulse signal consists of one pulse every 16.667 milliseconds which is the period of the 60 Hz electrical signal and is fed to the computing device 32 on lead line 56. The computing device 32 counts the pulse signal and generates a signal representative of the total elapsed operating hours of the water chilling system on its output line 58. This output signal on the line 58 is fed to the divider network 46 whose output via line 60 is coupled to the visual display unit 48. The display unit is capable of indicating visually operating hours from 0 to 99,999.

The microprocessor-basec computing device 32 also has a user-programmable device for presetting selectively a desired maintenance time interval between the range of 1 to 9,999 hours. Upon the user's initiation, the programmable device begins counting down the preset maintenance time interval to zero. At zero hours, a logic "1" signal is produced on line 62 which is coupled to the buffer/inverter 50 for generating a logic "0" signal on line 16. The logic "0" signal is an output signal representing that a specific centrifugal water chilling system has completed a preset number of operating hours and is due for a scheduled maintenance. This logic "0" signal is sent to the telemetry system for alerting appropriate service personnel that such maintenance is now required.

The +6.9 VDC regulated voltage on the line 22 is coupled to the input of the voltage switching regulator 36 whose output via lines 64 and 66 are capable of producing +7 VDC and +25 VDC, respectively. The output of the +5 VDC voltage regulator on lead line 63 is used to supply power to the computing device 32. The switching regulator 36 is controlled by the computing device 32 via the lead line 65. The output line 64 of the regulator 36 drives the input of the +5 VDC regulator 38, and the output line 66 of the regulator 36 drives the input of the non-volatile memory device 34 to deliver a programming voltage signal on line 66 thereto upon command from the computing device 32 via line 67. The programming voltage signal on the line 66 causes the total elapsed operating hours and the preset maintenance time interval to be sent from the computing device via line 69 and to be recorded permanently in the memory device 34, thereby avoiding loss of such information in the event of a power failure and/or a battery back-up failure.

In order to control the mode of operation of the microprocessor-based computing device 32, the function programming or selection switches 44 have their output connected to the computing device via line 68 and have three input push-button terminals 70, 72, and 74 designated "mode", "reset/up", and "down". In the normal operating condition, the display unit 48 displays the total elapsed operating hours. Upon depressing once and releasing of the "mode" push-button terminal 70, the display unit will read out the number of operating hours before expiration of the present maintenance time interval. This readout will appear for five seconds and then automatically return to the displaying of the total elapsed operating hours. Upon depressing and releasing of the push-button terminal 70 twice in rapid succession, the display unit will read out the preset maintenance time interval. Again, this readout will appear for five seconds and then automatically return to the displaying of the total elapsed operating hours.

In order to adjust or select the desired maintenance time interval, the push-button terminal 70 is depressed and held for three seconds to place the timer system into the "adjust" mode. The display unit 48 will not indicate the maintenance interval time setting. Then, the "reset/up" push-button terminal 72 can be depressed and held to increase or advance the time setting. Similarly, the "down" push-button terminal 74 can be depressed and held to decrease or reduce the time setting. For returning the readout on the display unit to the total elapsed operating hours, the "mode" push-button terminal 70 is depressed once and released. The desired maintenance time interval is now preset. Upon a subsequent depressing and releasing of the "reset/up" push-button terminal 72, the display will blank, the computing device will signal the voltage switching regulator to provide a programming voltage signal to the non-volatile memory; the total elapsed operating hours and the preset maintenance interval is recorded; and the preselected maintenance timer interval will begin counting down to zero.

Figure 4:
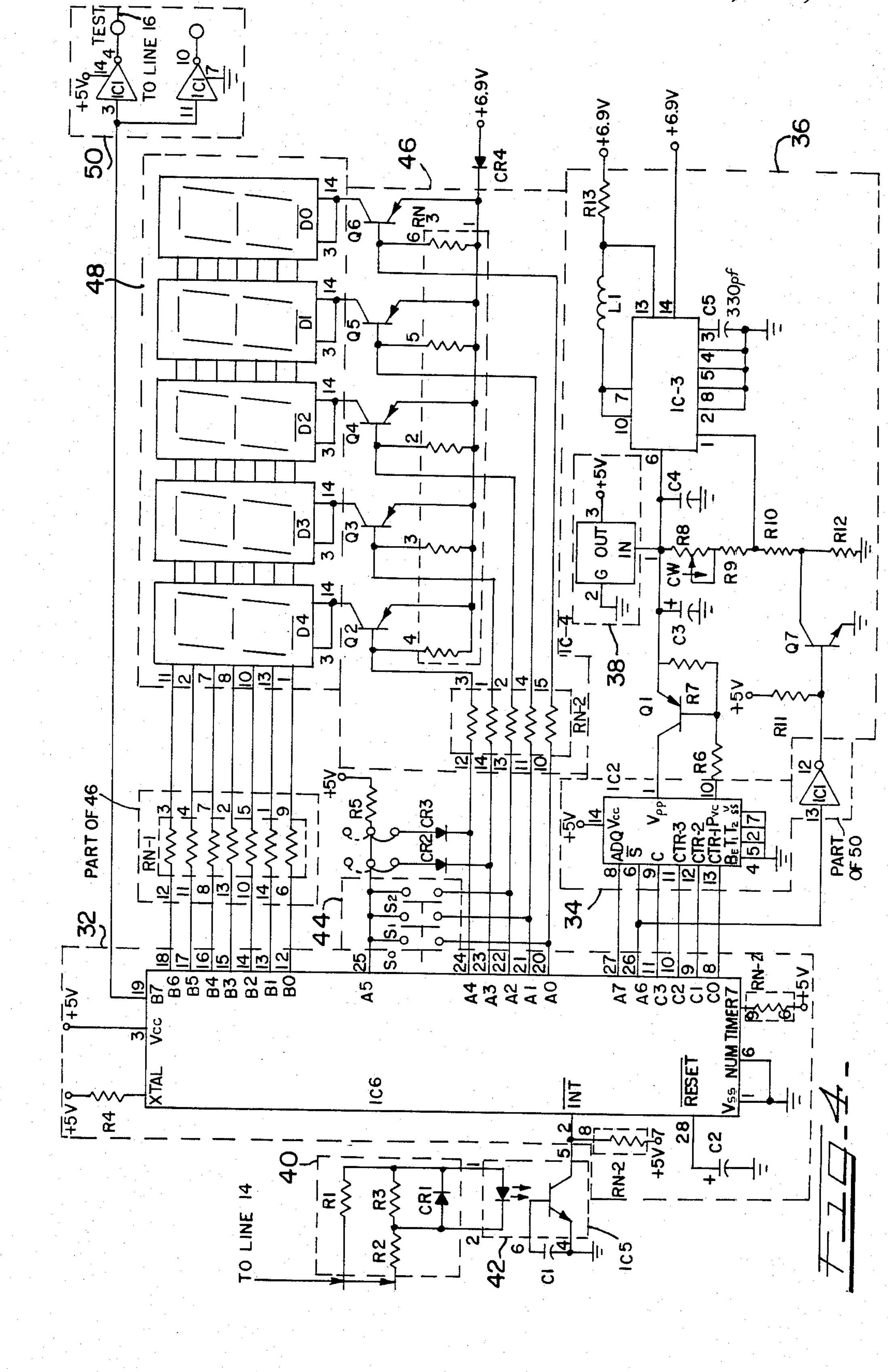
FIG. 4 is a schematic diagram showing circuitry suitable for use as a preferred embodiment for the programmable maintenance timer system depicted in FIG. 3.

While the different blocks shown in FIG. 3 may take on various forms, a schematic circuit diagram illustrating a preferred embodiment of the programmable maintenance timer system of the present invention with many of the blocks shown in more detail is depicted in FIG. 4. For completeness in the disclosure of the above-described system but not for purposes of limitation, the following representation values and component identifications shown in FIG. 4 are submitted. These values and components were employed in a system that was constructed and tested and which provides high quality performance. It should be clearly understood that those skilled in the art will recognize that many alternative elements and values may be employed in constructing the various circuits in the programmable maintenance timer system in accordance with the present invention.

| Transistors | Type |
|---|---|
| Q1 | 2N4403 |
| Q2–Q6 | 2N4403 |
| Q7 | 2N4400 |
| **Diodes** | **Type** |
| CR1–CR4 | 1N4446 |
| **Resistors** | **Value in Ohms** |
| R1, R2, R4 | 12K |
| R3, R5, R7, R11 | 10K |
| RN-1 | 330 |
| RN-2 | 4.7K |
| RN-3 | 10K |
| R6 | 47K |
| R8 | 5K |
| R9 | 7.5K |
| R10 | 499 |
| R12 | 887 |
| R13 | .68 |
| **Capacitors** | **Value in Microfarads** |
| C1 | .0022 |
| C2 | 0.47 |
| C3 | 50 |
| C4, C6, C7, C8, C10 | .01 |
| C5 | $330 \times 10^{-6}$ |
| C9 | 10 |
| C11 | 50 |
| **Integrated Circuits** | **Type** |
| IC1 | 74LS05 |
| IC2 | MCM2801P |
| IC3 | TL497ACN |
| IC4 | MC7805ACT |
| IC5 | 4N36 |
| IC6 | MC6805P2 |
| **Inductor** | **Value in Microhenries** |
| L1 | 250 |

As can be seen, the microprocessor-based computing means 32 consists of a part designated as MC6805P2 which is manufactured and sold by Motorola Semiconductor Products Inc., a subsidiary of Motorola Inc. The MC6805P2 is an 8-bit microprocessor containing a CPU, on-chip clock, ROM, RAM, I/O and timer. The non-volatile memory device 34 consists of a part designated as MCM2801P which is also made by Motorola. The MCM2801P is a 256-bit serial electrically erasable programmable read-only-memory. The visual display unit 48 is a five-digit, seven-segment light emitting diode (LED) readout.

Figure 5:
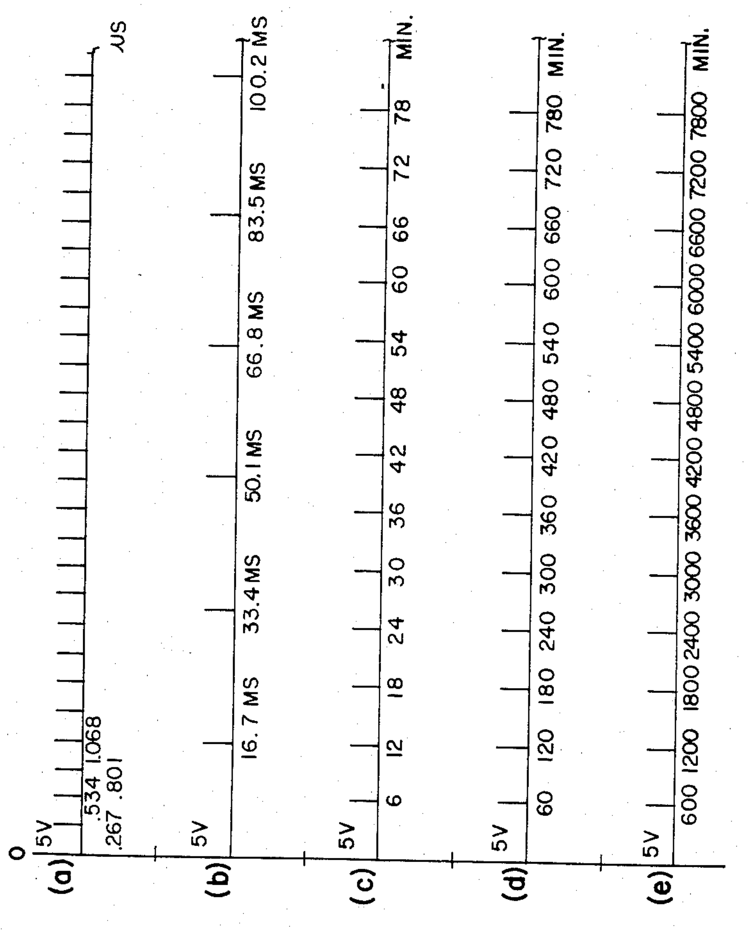
FIG. 5(*a*) is a timing graph showing the internal clock pulses of the microprocessor depicted in FIG. 4.

In FIGS. 5(*a*) through 5(*e*), there are shown timing graphs illustrating the operating characteristics of the 8-bit microprocessor at various terminal points. FIG. 5(*a*) shows the internal clock pulses of the microprocessor where one pulse is generated every 0.267 microseconds. These clock pulses appear at the terminal point labeled "XTAL". FIG. 5(*b*) shows the input pulses from the water chilling system where one pulse is generated every 16.7 milliseconds. These input pulses appear at the terminal point labeled "$\overline{\text{INT}}$". The microprocessor counts the input pulses and updates its internal random-access memory (RAM) every six minutes. A timing graph illustrating this update is provided in FIG. 5(*c*). After ten successive RAM updates, the five-digit, seven-segment LED display 48 showing the total elapsed operating hours is incremented by one hour. FIG. 5(*d*) depicts the pulse train for updating the display as provided on terminal point labeled "B0 through B6". Every ten hours upon command by the microprocessor, an update pulse is sent to the electrically erasable programmable read-only-memory (EEPROM) on the terminal point labeled "A7". FIG. 5(*e*) illustrates the pulse train for updating the memory in the EEPROM.

From the foregoing detailed description, it can thus be seen that the present invention provides a programmable maintenance timer system for displaying the total elapsed operating hours of industrial equipment and for generating an output signal at the expiration of a preselected number of hours to a telemetry system. The timer system of the present invention includes a microprocessor-based computing device with programming means for presetting selectively a maintenance time interval representing a number of operating hours before a maintenance service is to be performed, for counting down the time interval to zero, and for generating the output signal after the time interval has reached zero to the telemetry system so as to alert service personnel that the industrial equipment is due for a scheduled maintenance.

While there has been illustrated and described what is at present to be the preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A programmable maintenance timer system suitable for use with industrial equipment such as a centrifugal water chilling system and a telemetry system, said timer system comprising:

interface circuit means for receiving an AC electrical signal and for generating a pulse signal in response to said electrical signal;

a microprocessor-based computing means for calculating a signal representative of total elapsed operating hours of an industrial equipment in response to said pulse signal;

said microprocessor-based computing means including programming means for presetting selectively a maintenance time interval representing a number of operating hours before a maintenance service is to be performed, for counting down said time interval to zero, and for generating an output signal after said time interval has reached zero to a telemetry system so as to alert service personnel that the industrial equipment is due for a scheduled maintenance;

display means responsive to said signal representative of the total elapsed operating hours for indicating visually the total elapsed operating hours;

and function programming switching means for controlling mode of operating of said microprocessor-based computing means;

said switching means including a mode switch for activating said display means to indicate either the total elapsed operating hours, the hours remaining on the maintenance time interval before reaching zero, or the preset maintenance time interval; a reset/up switch for returning the maintenance interval to the beginning preset maintenance interval value so that it counts down again to zero and for adjusting selectively by increasing the desired maintenance interval; and a down switch for adjusting selectively by decreasing the desired maintenance interval.

2. A programmable maintenance timer system as claimed in claim 1, wherein said microprocessor-based computing means further generates a programming voltage signal, and wherein a non-volatile memory device responsive to said programming voltage signal is provided for recording permanently the total elapsed operating hours and the preset maintenance time interval so as to avoid loss of such information upon a power failure and/or a battery back-up failure, every ten hours of count pulse accumulation, and every time the reset/up switch is activated.

3. A programmable maintenance timer system as claimed in claim 1, wherein said microprocessor-based computing means comprises an 8-bit microprocessor, and wherein a non-volatile memory device comprises an electrically erasable programmable read-only-memory, said display means comprises a 5-digit, 7-segment light-emitting diode display unit, and said interface circuit means comprises a divider network and a photocoupler.

4. A programmable maintenance timer system as claimed in claim 1, further comprising inverter/buffering means connected to said microprocessor-based computing means for generating said output signal, and wherein said maintenance time interval is adjustable between 1 to 9,999 hours.

* * * * *